(12) United States Patent
Yoshida

(10) Patent No.: US 8,050,464 B2
(45) Date of Patent: Nov. 1, 2011

(54) IMAGE TAKING APPARATUS AND IMAGE TAKING METHOD

(75) Inventor: Masanori Yoshida, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 977 days.

(21) Appl. No.: 11/965,452

(22) Filed: Dec. 27, 2007

(65) Prior Publication Data

US 2008/0159628 A1 Jul. 3, 2008

(30) Foreign Application Priority Data

Dec. 27, 2006 (JP) ................. 2006-353205

(51) Int. Cl.
*G06K 9/00* (2006.01)
*G06K 9/36* (2006.01)
*H04N 7/18* (2006.01)
*H04N 5/232* (2006.01)
*G03B 41/00* (2006.01)

(52) U.S. Cl. ........ 382/118; 382/106; 382/284; 348/143; 348/E5.042; 396/322

(58) Field of Classification Search .................. 382/118, 382/284, 106, 154, 103, 155, 168, 171, 172, 382/203, 216, 214, 254, 276, 291, 321; 348/E5.001, 348/E5.024, E5.042, E5.047, 207.99, 373, 348/375, 222.1, 61, 143, 333.01, 311, 371, 348/348, E5.04, E5.02, 333; 396/427, 222, 396/234, 322
See application file for complete search history.

(56) References Cited

U.S. PATENT DOCUMENTS

| | | | |
|---|---|---|---|
| 5,757,461 A * | 5/1998 | Kasahara et al. | 351/206 |
| 7,095,901 B2 * | 8/2006 | Lee et al. | 382/255 |
| 7,199,830 B1 * | 4/2007 | Tanaka et al. | 348/362 |
| 7,535,486 B2 * | 5/2009 | Motomura et al. | 348/158 |
| 7,616,233 B2 * | 11/2009 | Steinberg et al. | 348/222.1 |
| 7,706,674 B2 * | 4/2010 | Sugimoto et al. | 396/61 |
| 7,750,966 B2 * | 7/2010 | Horie | 348/333.01 |
| 2005/0024586 A1 * | 2/2005 | Teiwes et al. | 351/209 |
| 2007/0269082 A1 * | 11/2007 | Matsuyama | 382/118 |
| 2009/0115868 A1 * | 5/2009 | Kim et al. | 348/222.1 |

FOREIGN PATENT DOCUMENTS

| | | |
|---|---|---|
| JP | 06-149904 A | 5/1994 |
| JP | 2003-92700 A | 3/2003 |
| JP | 2004-336265 A | 11/2004 |
| JP | 2005-234765 A | 9/2005 |
| JP | 2008-005438 A | 1/2008 |

* cited by examiner

OTHER PUBLICATIONS

Explanation of circumstances concerning accelerated examination, dated Aug. 26, 2010, submitted in corresponding JP Application No. 2006-353205, 5 pages in English and Japanese.

*Primary Examiner* — Sheela Chawan
(74) *Attorney, Agent, or Firm* — Sughrue Mion, PLLC

(57) ABSTRACT

An image taking apparatus according to an aspect of the invention comprises: an image pickup device which picks up an object image and outputs the picked-up image data; a face detection device which detects human faces in the image data; a face-distance calculating device which calculates the distance between the faces among a plurality of faces detected by the face detection device; and a controlling device which controls the image pickup device to start shooting, after a shooting instruction is issued, in the case where the distance between the faces calculated by the face-distance calculating device is not greater than a first predetermined threshold value. The image taking apparatus allows shooting the moment the distance between the faces is close enough not be greater than to a predetermined threshold value.

10 Claims, 8 Drawing Sheets

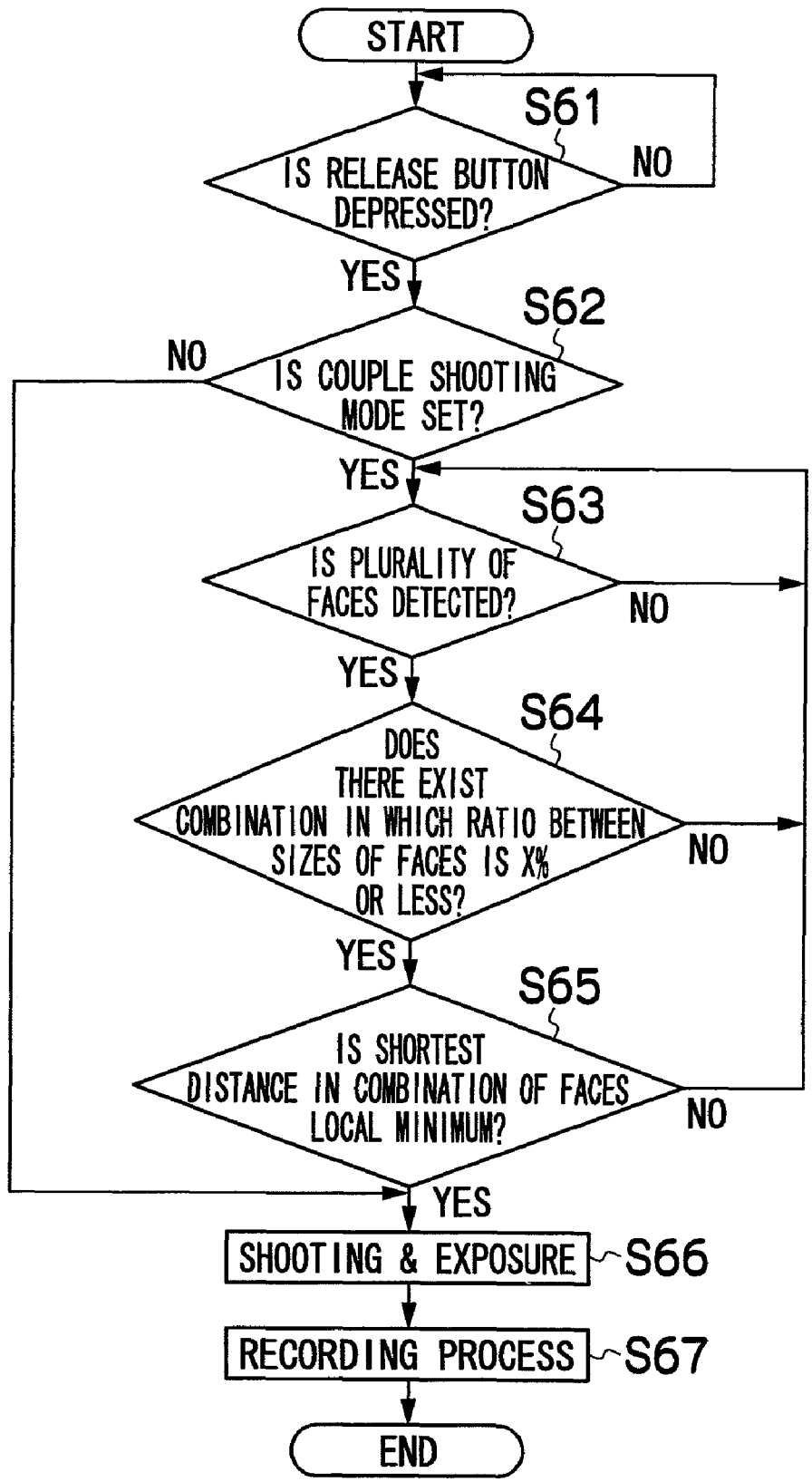

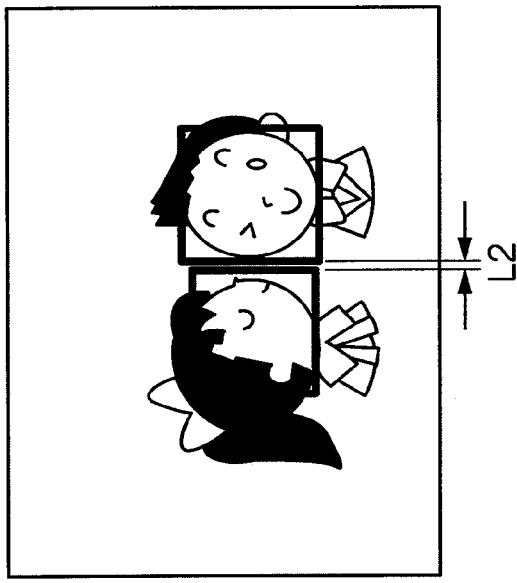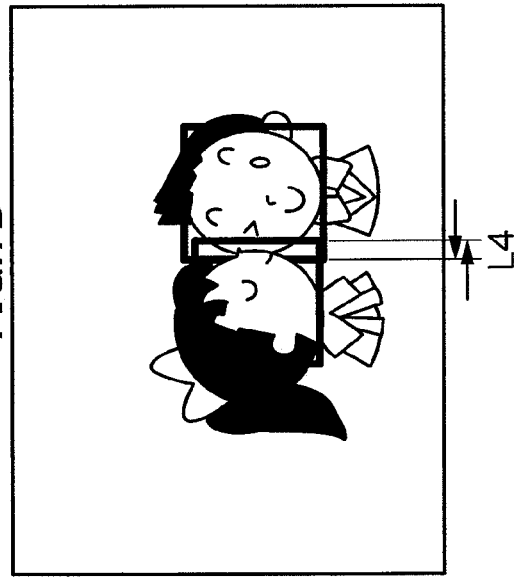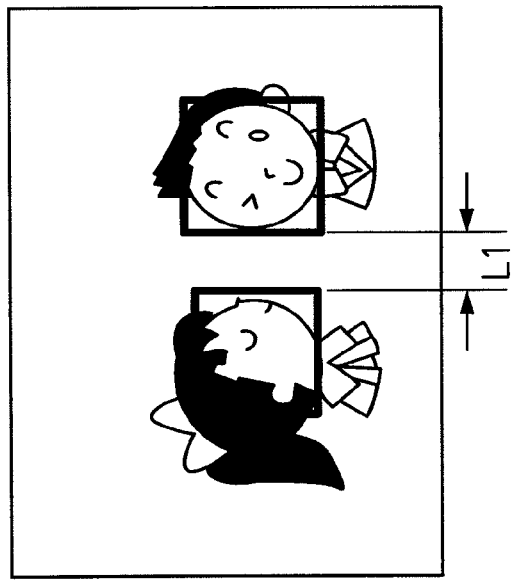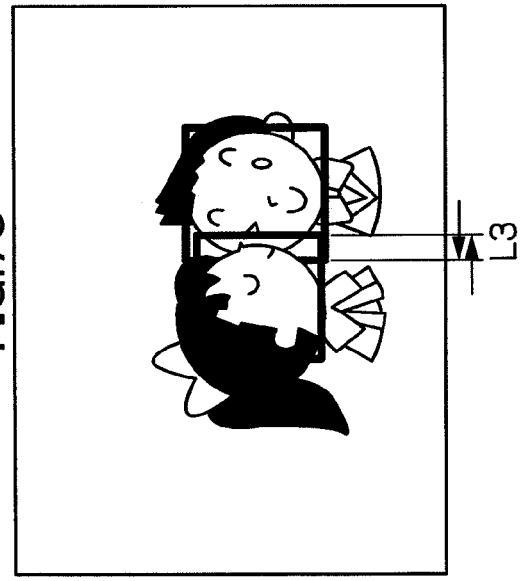

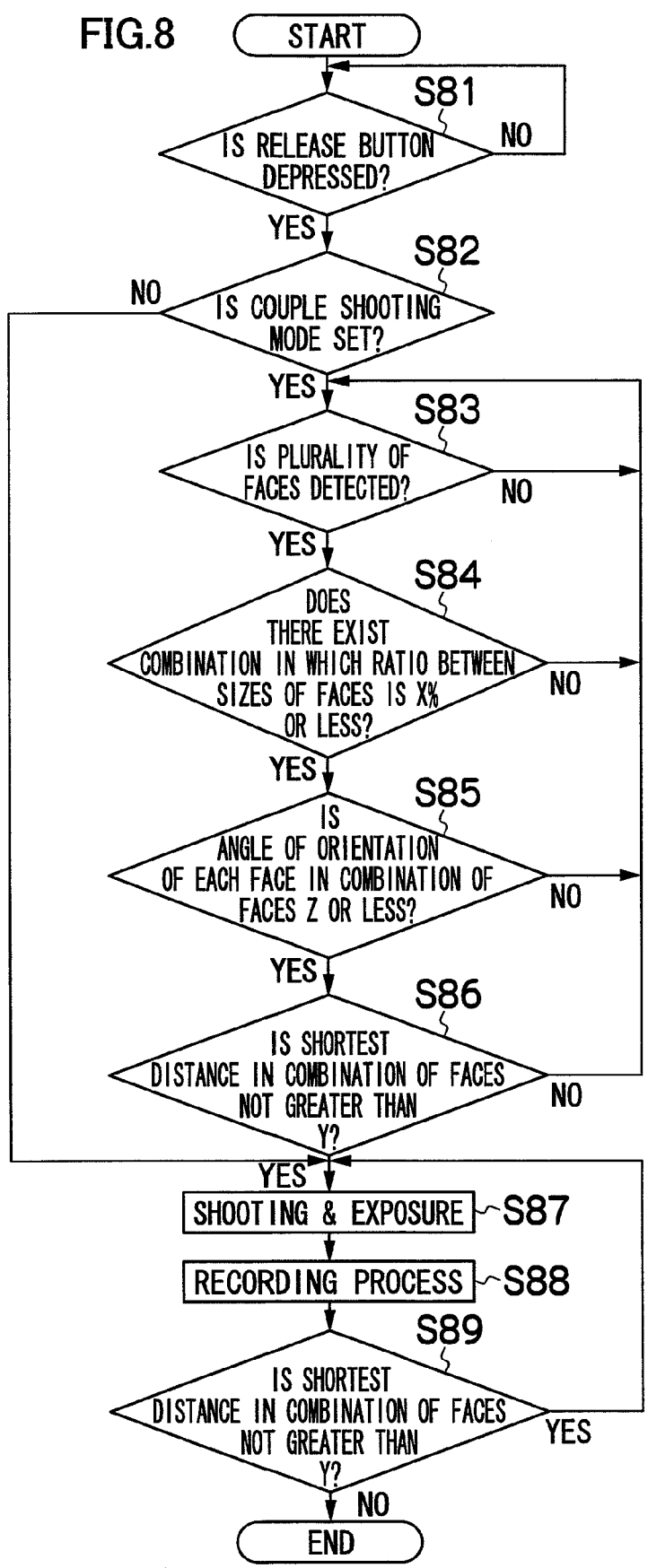

FRONT

FRONT

FRONT

FRONT

IMAGE TAKING APPARATUS AND IMAGE TAKING METHOD

BACKGROUND OF THE INVENTION

1. Field of the Invention

The present invention relates to an image taking apparatus and an image taking method, and in particular, to an image taking apparatus and an image taking method capable of detecting a face area from image data.

2. Description of the Related Art

A digital still camera (DSC) which detects human faces and performs various controls based on information on the human faces has been disclosed in patent documents in recent years. For example, Japanese Patent Application Laid-Open No. 2003-92700 describes a digital camera (image taking apparatus) in which a face image is detected to automatically depress a release button so as to surely capture human faces. Japanese Patent Application Laid-Open No. 2004-336265 describes an image taking apparatus which releases a shutter when it detects the eyes of the preset number of people at the time of self-timer photographing.

SUMMARY OF THE INVENTION

For example, when a camera user desires to shoot the moment a bridegroom kisses his bride at a mass wedding ceremony, the user often misses shooting the moment. On the other hand, with the advancement of a face detection technology, a plurality of human faces can be momentarily detected at a time.

The present invention has been made in view of the above situations, and has its objects to provide an image taking apparatus capable of shooting, with use of a face detection function, the moment a couple kisses at the above scene or the moment a parent and its child are affectionately laying their cheeks against each other.

To achieve the above objects, an image taking apparatus according to an aspect of the invention comprises: an image pickup device which picks up an object image and outputs the picked-up image data; a face detection device which detects human faces in the image data; a face-distance calculating device which calculates a distance between the faces among a plurality of faces detected by the face detection device; and a controlling device which controls the image pickup device to start shooting, after a shooting instruction is issued, in the case where the distance between the faces calculated by the face-distance calculating device is not greater than a first predetermined threshold value.

This allows shooting the moment the distance between the faces is close enough not be greater than to a predetermined threshold value.

To achieve the above objects, an image taking apparatus according to an another aspect of the invention comprises: an image pickup device which picks up an object image and outputs the picked-up image data; a face detection device which detects human faces in the image data; a face-distance calculating device which calculates a distance between the faces among a plurality of faces detected by the face detection device; and a controlling device which controls the image pickup device to start shooting, after a shooting instruction is issued, in the case where the distance between the faces calculated by the face-distance calculating device becomes local minimum with respect to change in time.

This enables shooting the moment the faces are the closest to each other.

The image taking apparatus according to the present invention further preferably comprises a face size comparing device which compares sizes of a plurality of the faces detected by the face detection device, wherein the face-distance calculating device calculates the distance between the faces among a plurality of faces for which the face-size comparing device determines that the difference between the sizes of the faces is not greater than a second predetermined threshold value.

This allows preventing an error in shooting in the case where faces different in distance in the depth direction overlap because the face-distance calculating device calculates the distance between faces which are close to the image taking apparatus in the depth direction.

The image taking apparatus according to the present invention may further include a face-orientation comparing device which compares orientations of a plurality of the faces detected by the face detection device, wherein the face-distance calculating device may calculate the distance between the faces among a plurality of faces for which the face-orientation comparing device determines that orientations of both faces correspond to any of the following combinations: both faces being full-faced; the sides of both faces opposing each other; or one of both faces being full-faced and the other being the side facing the full face.

This calculates the distance between the faces facing a predetermined direction, so that a more proper scene can be captured.

To achieve the above objects, an image taking method according to an aspect of the present invention comprises the steps of: picking up an object image and outputting the picked-up image data; detecting human faces in the image data; calculating a distance between the faces among a plurality of faces detected by the face detection step; and controlling the image pickup step to start shooting, after a shooting instruction is issued, in the case where the distance between the faces calculated by the face-distance calculating step is not greater than a first predetermined threshold value.

This enables shooting the moment the distance between the faces is close enough not to be greater than a predetermined threshold value.

To achieve the above objects, an image taking method according to an another aspect of the present invention comprises the steps of: picking up an object image and outputting the picked-up image data; detecting human faces in the image data; calculating a distance between the faces among a plurality of faces detected by the face detection step; and controlling the image pickup device to start shooting, after a shooting instruction is issued, in the case where the distance between the faces calculated by the face-distance calculating step becomes local minimum with respect to change in time.

This enables shooting the moment the faces are the closest to each other.

According to the present invention, a distance between faces is calculated to shoot the moment the distance between the faces is close enough not to be greater than a predetermined threshold value, which enables shooting the moment couple's faces are close to each other and they kiss at scenes, for example, at a mass wedding ceremony. Since the sizes of faces are compared with each other to calculate the distance between the faces which are close in the depth direction, an error in shooting in the case where faces different in distance in the depth direction overlap can be prevented. Since the orientations of the faces are compared with each other to calculate the distance between the faces in combinations in which the orientation of each face is a predetermined value or less, shooting a proper scene is enabled.

BRIEF DESCRIPTION OF THE DRAWINGS

FIG. 6 is a flow chart showing the operation of the digital camera 1 in the second embodiment of the present invention in the couple shooting mode;

FIGS. 7A, 7B, 7C and 7D are pictures illustrating the faces displayed on the image display device 14;

FIG. 8 is a flow chart illustrating the operation of the digital camera 1 in the couple shooting mode.

DETAILED DESCRIPTION OF THE PREFERRED EMBODIMENTS

A preferred embodiment of the image taking apparatus according to the present invention is described below with reference to the accompanying drawings.

First Embodiment

Figure 1:
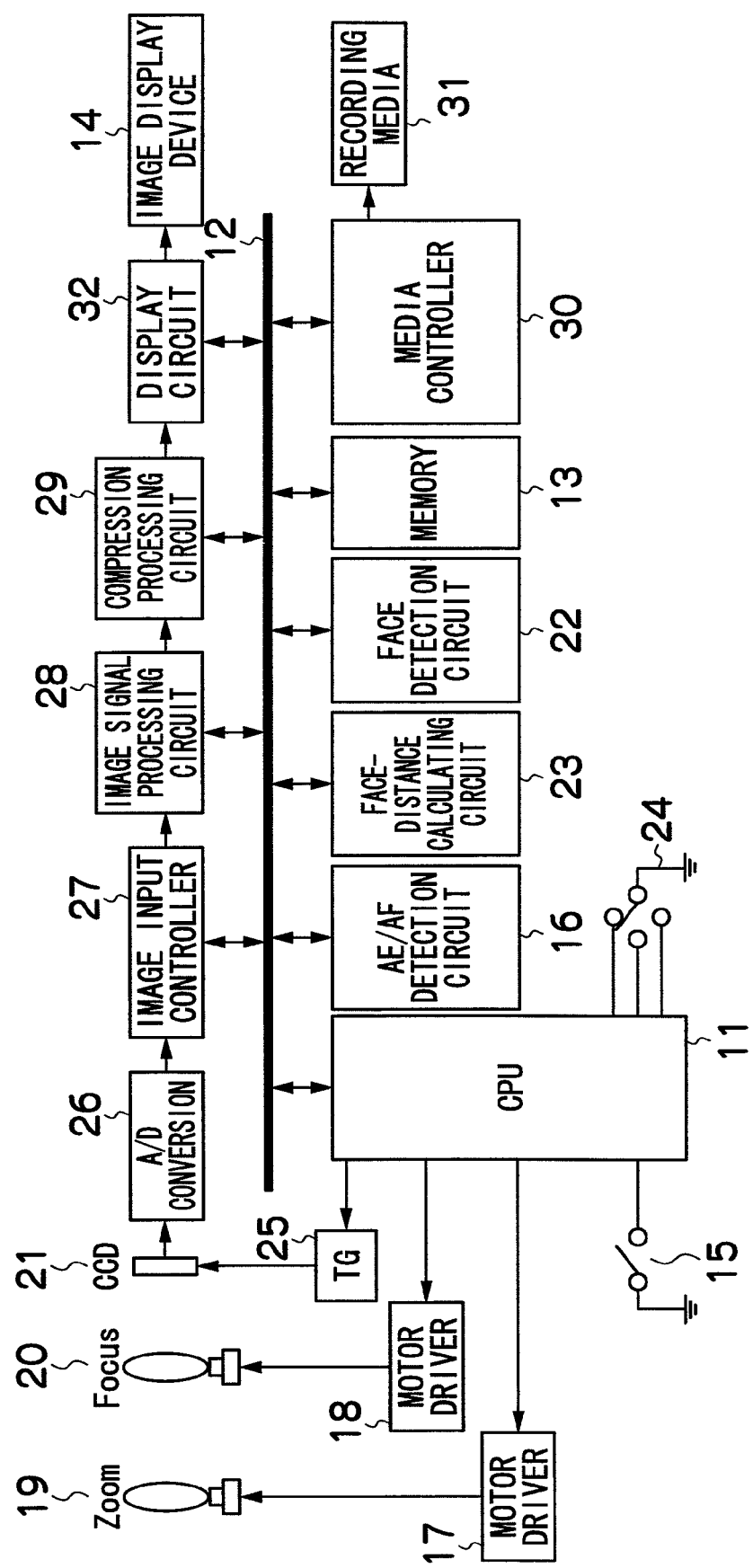
FIG. 1 is a block diagram illustrating one example of an internal configuration of a digital camera 1 of the first embodiment according to the present invention.

FIG. 1 is a block diagram illustrating one example of an internal configuration of a digital camera 1 of the first embodiment according to the present invention.

In the figure, a CPU 11 overall controls each circuit in the digital camera 1 based on inputs from various operational switches and executes processing in accordance with camera controlling programs.

The CPU 11 controls each circuit through a BUS 12. The CPU 11 sends and receives required data to and from a memory 13. The inside of the memory is separated into a ROM and a RAM area. The ROM area stores a camera controlling program, an opening image at the time of booting, an ending image at the time of stopping, a GUI image such as a menu image used for the operation of the digital camera 1, an image used for a screen saver, an image displaying progress in processing (such as an image of a sandglass whose scale changes), key-operation sound such as shutter sound and the like, alarm sound and sound data representing error sound.

When a power supply is turned on, the CPU 11 detects that the power supply has been turned on, turns on the power supply of the camera and displays for a certain period the opening image stored in the ROM area of the memory 13, and then turns the camera to a shooting standby state in a shooting mode. The CPU 11 causes an image display device 14 to display a moving image or a through-the-lens image in the shooting standby state.

A camera user (or a shooter) frames a picture while viewing the through-the-lens image displayed on the image display device 14, confirms an object which he or she wants to shoot or a shot image or sets imaging conditions.

A face detection circuit 22 detects a face in the object image in the shooting standby state and causes the image display device 14 to display the detected face with a frame. In a couple shooting mode described later, if the faces detected by the face detection circuit 22 is plural, a face-distance calculating circuit 23 calculates a distance between the faces. The face detection circuit 22 and the face-distance calculating circuit 23 are described in detail later.

When a release button is depressed in the shooting standby state, the CPU 11 performs focus control, photometry and exposure control to drive a zoom lens 19 and a focus lens 20 through a zoom motor-driver 17 and a focus motor-driver 18 based on results detected by an AE/AF detection circuit 16 and images the object image on the light receiving surface of a CCD 21 through these lenses. The CCD 21 converts the object image imaged on the light receiving surface into signal electric charges according to the quantity of light of the object image. The signal electric charges are read to a shift register by a read gate pulse applied by a timing generator 25 and sequentially read by a register transfer pulse as a voltage signal according to the signal electric charge.

Analog R, G and B signals being the voltage signals output from the CCD 21 are converted into digital R, G and B signals by an A/D converter 26. The digital R, G and B signals are temporarily stored in the RAM area of the memory 13 by an image input controller 27.

An image signal processing circuit 28 reads original R, G and B data stored in the RAM area of the memory 13, applies a digital gain according to the kinds of light sources to the original R, G and B data to adjust a white balance and performs gamma (gradation conversion) and sharpness processing and the like to generate R, G and B signals. Furthermore, the image signal processing circuit 28 performs YC signal processing to generate a luminance signal Y and chroma signals Cr and Cb (YC signals) and stores the signals again in the RAM area of the memory 13.

The YC signals thus stored in the RAM area of the memory 13 are compressed by a compression processing circuit 29 into a predetermined format and then recorded in a recording medium 31 detachable to the digital camera 1 through a media controller 30.

When a reproducing mode is selected by operating a mode button 24, an image file of the latest frame stored in the recording medium 31 is read out through a media controller 30. The compressed data of the read image file is expanded into a non-compressed YC signal through the compression processing circuit 29.

The expanded YC signal is converted to a signal format for display by a display circuit 32 and output to the image display device 14. This displays the image of the latest frame stored in the recording media 31 on the image display device 14.

The face detection circuit 22 and the face-distance calculating circuit 23 are described below with reference to FIGS. 2 and 3.

Figure 2:
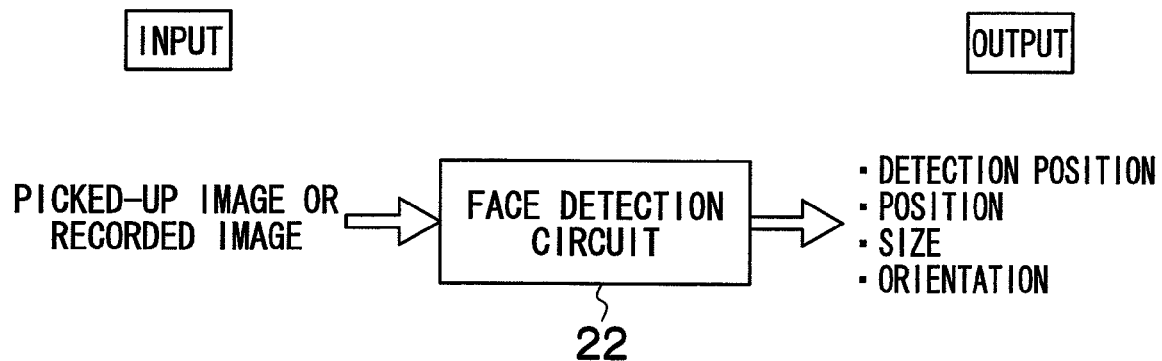
FIG. 2 is a schematic diagram of the face detection circuit 22.

FIG. 2 is a schematic diagram of the face detection circuit 22. The face detection circuit 22 receives image data of an object image imaged on the light receiving surface of the CCD 21 or image data stored in the recording medium 31, analyzes these image data to detect human faces and outputs the number of the detected faces, the position, size and orientation of each face.

Figure 3:
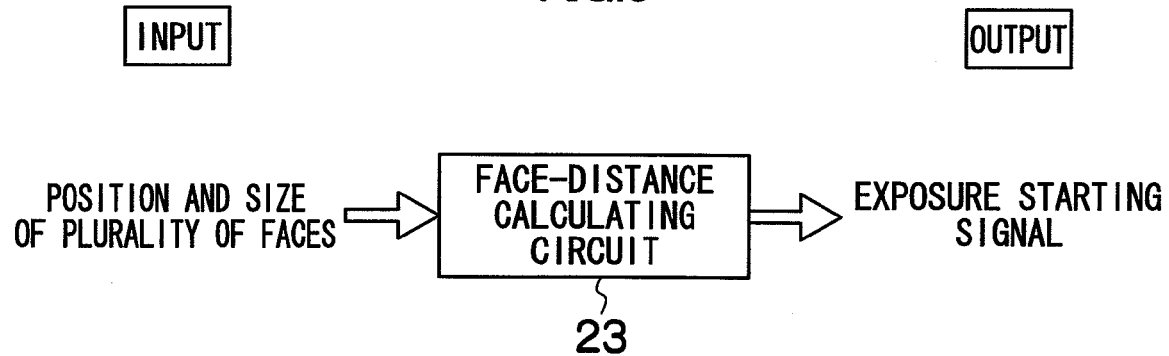
FIG. 3 is a schematic diagram of the face-distance calculating circuit 23.

FIG. 3 is a schematic diagram of the face-distance calculating circuit 23. The face-distance calculating circuit 23 receives the position and size of each face in the image data, calculates a distance between the faces and outputs an exposure starting signal if there exists a combination of faces in which the calculated distance is 1% or less of the size of an intended face.

Figure 4:
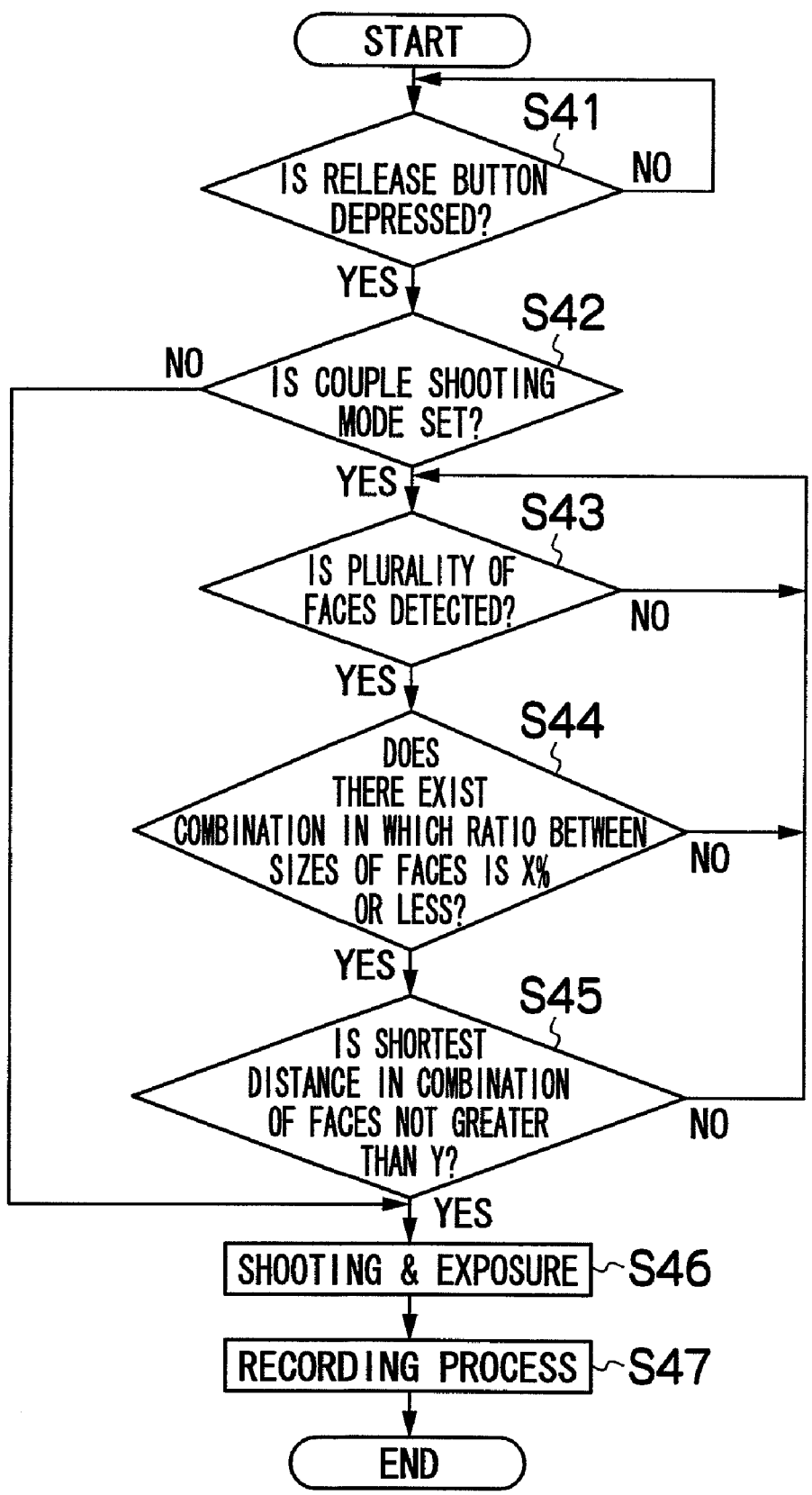
FIG. 4 is a flow chart illustrating the operation of the digital camera 1 in the first embodiment of the present invention in the couple shooting mode.

The operation of the digital camera 1 in a couple shooting mode is described below with reference to FIG. 4. FIG. 4 is a flow chart illustrating the operation of the digital camera 1 in the couple shooting mode. When the digital camera 1 of the first embodiment according to the present invention is set to the couple shooting mode and the release button 15 is depressed, the digital camera 1 shoots when a distance between faces is close to each other in a combination in which the faces are the same in size.

Figure 5:
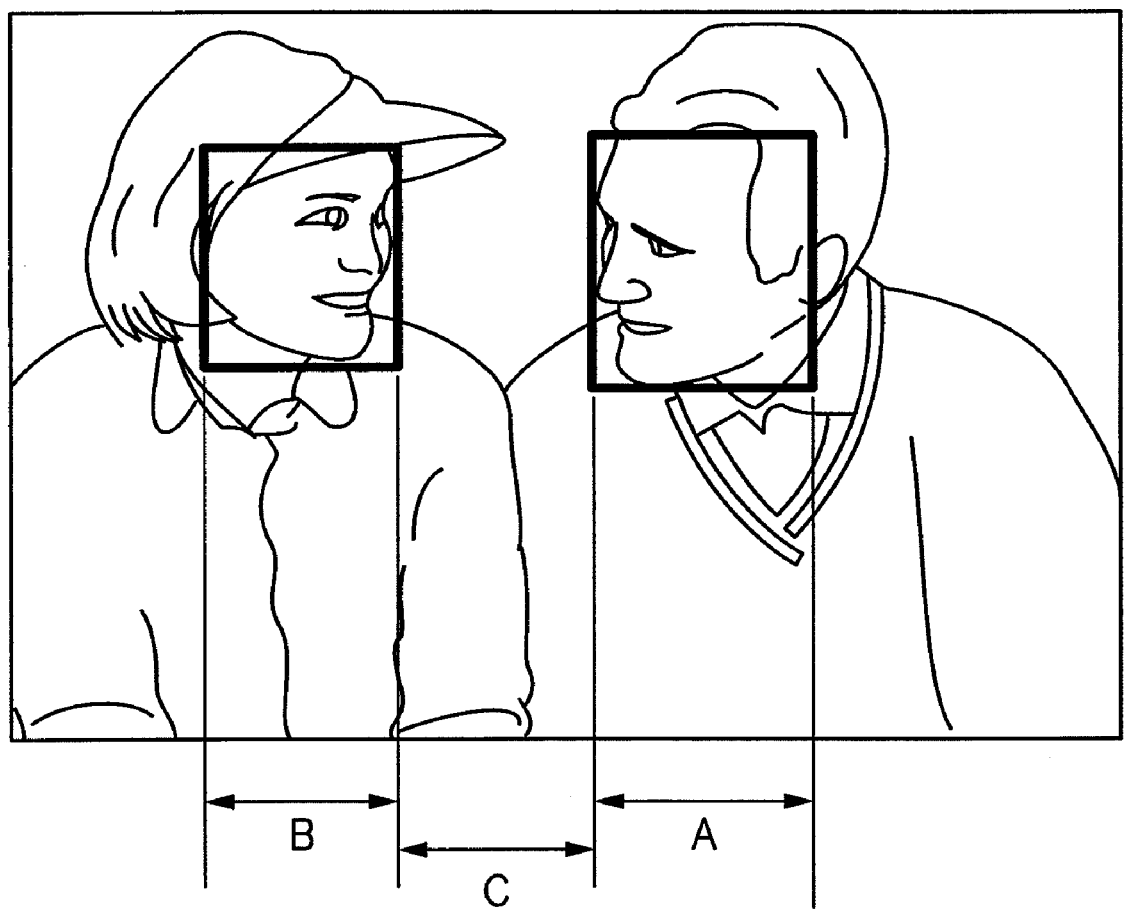
FIG. 5 is a picture illustrating the faces displayed on the image display device 14 in the couple shooting mode.

A determination is made as to whether the release button 15 is depressed (step S41). As described above, in the shooting standby state before the release button 15 is depressed, the through-the-lens image is displayed on the image display device 14, the face detection circuit 22 detects a face in the object image and the detected face is framed on the display. FIG. 5 is the picture illustrating the detected faces which are framed on the image display device 14.

When the release button 15 is depressed, a determination is made as to whether the couple shooting mode is set (step S42). If the couple shooting mode is not set, a normal shooting is performed (step S46) and the shooting data is stored in the recording media 31 (step S47).

If the couple shooting mode is set, a determination is made as to whether the face detection circuit 22 detects a plurality of faces (step S43). If the face detection circuit 22 does not detect a plurality of faces or if it detects a single face, the face detection circuit 22 continues the detection until it detects a plurality of faces.

If the face detection circuit 22 detects a plurality of faces, a determination is made as to whether there exists a combination in which the ratio between the sizes of faces is 100%±20% or less (step S44). As described above, the face detection circuit 22 can detect faces in the image data and calculate the size of the detected face. The CPU 11 extracts a combination in which the ratio between the sizes of faces is 100%±20% or less from combinations of faces.

In FIG. 5, the face detection circuit 22 calculates the sizes A and B of the two detected faces and the CPU 11 finds the ratio between the sizes of the two faces (A/B×100) and determines whether the ratio is 100%±20% or less.

If there does not exist a combination in which the ratio between the sizes of the faces is 100%±20% or less, the process returns to the step S43 to detect faces again.

If there exists a combination in which the ratio between the sizes of the faces is 100%±20% or less, a determination is made as to whether a distance in the combination is not greater than 1% of the size of the face (step S45). The CPU 11 inputs position and size information of the respective faces for the combination of the faces in which the ratio between the sizes of the faces is 100%±20% or less into the face-distance calculating circuit 23. The face-distance calculating circuit 23 calculates a distance between the faces in the input combination and compares the distance with the size of the face. If the calculated distance between the faces is more than 1% of the size of the face, the process returns to the step S43 to detect faces again. If the calculated distance between the faces is not greater than 1% of the size of the face, the face-distance calculating circuit 23 outputs the exposure starting signal.

In FIG. 5, the face-distance calculating circuit calculates a distance C between the two faces and compares the distance C with 1% of the size A of the face. Here, 1% of the size B of the face may be used. Alternatively, it is allowed to calculate an average value of the sizes A and B to use 1% of the averaged value.

When the face-distance calculating circuit 23 outputs the exposure starting signal, the CPU 11 shoots based on the starting signal (step S46), the shooting data is stored in the recording medium 31 (step S47).

In the couple shooting mode, if the face detection circuit 22 does not detect a plurality of faces, if there does not exist a combination in which the ratio between the sizes of faces is 100%±20% or less and if the calculated distance between the faces is greater than 1% of the size of the face, even if the release button 15 is depressed, shooting is not performed to repeat the same routine. In this case, the release button 15 may be depressed again to cancel this shooting. Alternatively, a limiting time may be set to cancel this shooting after the limiting time passes. Alternatively, by depressing the release button 15 once again, a normal shooting may be performed.

Although the shooting is performed on the condition that the ratio between the sizes of faces is 100%±20% or less and the distance between the faces is less than 1% of the size of the face in the present embodiment, the present invention is not limited to these values, but the values may be appropriately determined.

A distance between faces does not need to be based on the size (for example, sizes A and B in FIG. 5) of the detected face, but may be calculated using an absolute value. For example, it is allowed to shoot in the case where a distance between the faces is close enough to be within 10 pixels or less.

As stated above, shooting after detecting that the faces are close to each other enables shooting without missing a photo opportunity such as a kissing scene of a couple. In addition, calculating a distance between faces which are the same in size allows preventing an error in shooting in the case where a face remote in the depth direction comes close laterally.

Second Embodiment

The operation of the digital camera 1 in the second embodiment of the present invention in the couple shooting mode is described below with reference to FIG. 6. FIG. 6 is a flow chart illustrating the operation of the digital camera 1 in the couple shooting mode. In the couple shooting mode of the digital camera 1 according to the second embodiment of the present invention, shooting is performed when a distance between the faces which are same in size is locally minimized with respect to change in time after the release button 15 is depressed.

A determination is made as to whether the release button 15 is depressed (step S61). In the shooting standby state before the release button 15 is depressed, as is the case with the first embodiment, the through-the-lens image is displayed on the image display device 14, the face detection circuit 22 detects a face in the object image and the detected face is framed on the display. FIGS. 7A, 7B, 7C and 7D are pictures illustrating the detected faces which are framed on the image display device 14.

When the release button 15 is depressed, a determination is made as to whether the couple shooting mode is set (step S62). If the couple shooting mode is not set, a normal shooting is performed (step S66) and the shooting data is stored in the recording media 31 (step S67).

If the couple shooting mode is set, a determination is made as to whether the face detection circuit 22 detects a plurality of faces (step S63). If the face detection circuit 22 does not detect a plurality of faces, or if it detects a single face, the face detection circuit 22 continues the detection until it detects a plurality of faces.

If the face detection circuit 22 detects a plurality of faces, a determination is made as to whether there exists a combination in which the ratio between the sizes of the faces is 100%±20% or less (step S64). As is the case with the first embodiment, the CPU 11 detects a combination in which the ratio between the sizes of the faces is 100%±20% or less from the sizes of the faces detected by the face detection circuit 22.

If there does not exist a combination in which the ratio between the sizes of the faces is 100%±20% or less, the process returns to the step S63 to detect faces again.

If there exists a combination in which the ratio between the sizes of the faces is 100%±20% or less, a determination is made as to whether a distance L in the combination is the local minimum value (step S65). The CPU 11 inputs information on a combination in which the ratio between the sizes of the faces is 100%±20% or less into the face-distance calculating circuit 23. The face-distance calculating circuit 23 of the second embodiment calculates the distance between the faces in the input combination and outputs the exposure starting signal when the distance becomes local minimum with respect to change in time.

As for the local minimum value, the distance between the faces is calculated at a predetermined time interval and the distance immediately before it increases is regarded as the local minimum value. How to determine the local minimum value is described with reference to FIG. 7.

FIGS. 7A, 7B, 7C and 7D are pictures illustrating the displays on the image display device 14 when the distance between the faces is calculated at a predetermined time interval at the time of shooting in the couple shooting mode. FIG. 7A is a display on the image display device 14 at a time Ta, FIG. 7B at a time Tb, FIG. 7C at a time Tc and FIG. 7D at a time Td, which show that time passes from Ta, Tb, Tc and Td in this order at intervals of a predetermined time T. In FIG. 7A, the distance between the faces is L1. In FIG. 7B in which the predetermined time T has passed since the time in FIG. 7A, the distance between the faces is L2, which is smaller than the distance L1. In FIG. 7C in which the predetermined time T has passed since the time in FIG. 7B, the distance between the faces is L3 (L3<0), which is further smaller than the distance L2. In FIG. 7D in which the predetermined time T has passed since the time in FIG. 7C, the distance between the faces is L4 (L4<0), which is larger than the distance L3. Consequently, the face-distance calculating circuit 23 determines that the distance L3 is the local minimum value and outputs the exposure starting signal.

When the face-distance calculating circuit 23 outputs the exposure starting signal, the CPU 11 shoots based on the output signal (step S66) and the shooting data is stored in the recording media 31 (step S67).

As stated above, shooting after detecting that the faces are close to each other enables shooting without missing a photo opportunity such as a kissing scene of a couple. In addition, calculating a distance between faces which are the same in size allows preventing an error in shooting in the case where a face remote in the depth direction comes close laterally.

As for the time interval T used for calculating a distance between the faces, a shorter time interval enables shooting at an appropriate timing rather than a longer time interval, however it increases an amount of computation, so it may be appropriately determined.

Third Embodiment

The operation of the digital camera 1 in the couple shooting mode according to the third embodiment of the present invention is described below with reference to FIG. 8. FIG. 8 is a flow chart illustrating the operation of the digital camera 1 in the couple shooting mode. In the couple shooting mode of the digital camera 1 according to the third embodiment of the present invention, the release button 15 is depressed, thereafter, shooting is actually performed when the distance between the faces is close in the combinations determined as any of the following: two faces which are the same in size and full-faced; two faces which are the same in size and the sides of which oppose; or two faces which are the same in size, one is full-faced and the other being the side faces the full face.

A determination is made as to whether the release button 15 is depressed (step S81). In the shooting standby state before the release button 15 is depressed, as is the case with the first embodiment, the through-the-lens image is displayed on the image display device 14, the face detection circuit 22 detects the face in the object image and the detected face is framed on the display.

When the release button 15 is depressed, a determination is made as to whether the couple shooting mode is set (step S82). If the couple shooting mode is not set, a normal shooting is performed. The description thereof is omitted.

If the couple shooting mode is set, a determination is made as to whether the face detection circuit 22 detects a plurality of faces (step S83). If the face detection circuit 22 does not detect a plurality of faces, or if it detects a single face, the face detection circuit 22 continues the detection until it detects a plurality of faces.

If the face detection circuit 22 detects a plurality of faces, a determination is made as to whether there exists a combination in which the ratio between the sizes of the faces is 100%±20% or less (step S84). If there does not exist a combination in which the ratio between the sizes of the faces is 100%±20% or less, the process returns to the step S83 to perform a face detection again.

If there exists a combination in which the ratio between the sizes of the faces is 100%±20% or less, a determination is made as to the orientation of each face in the combination (step S85). As described above, the face detection circuit 22 can detect faces in the image data and calculate the orientation of the detected face. The CPU 11 extracts combinations in which the angle of the orientation of each face is 90 degrees or less from the combinations of the faces which are same in size.

Figure 9D:
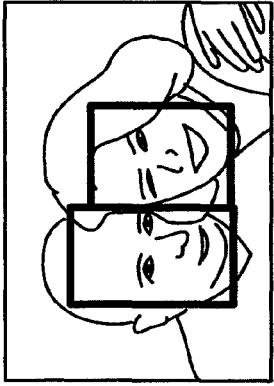
FIGS. 9A, 9B, 9C and 9D are pictures illustrating the display on the image display device 14 when shooting in the couple shooting mode and FIGS. 9A', 9B', 9C' and 9D' are bird's-eye views showing the results of analyzing the orientation of the detected faces in the respective displays.
Figure 9C:
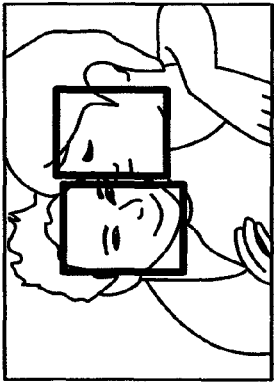
Figure 9B:
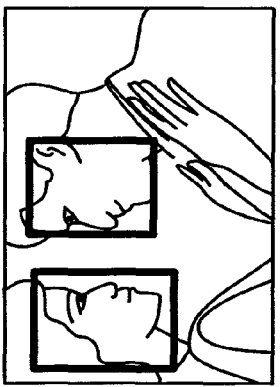
Figure 9A:
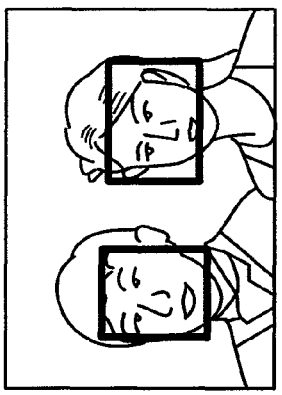
Figure 9D:
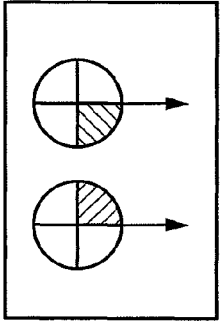
Figure 9C:
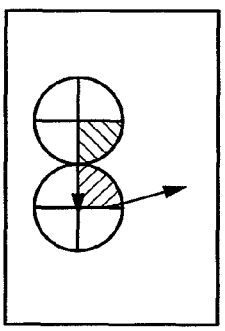
Figure 9B:
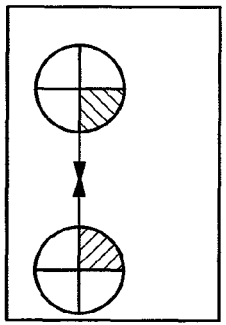
Figure 9A:
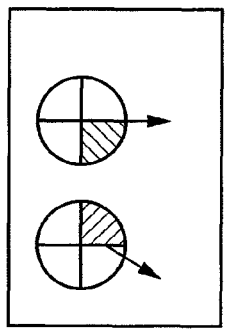

The angle of orientation of a face is described with reference to FIG. 9. FIGS. 9A, 9B, 9C and 9D are pictures illustrating the display on the image display device 14 at the time of shooting in the couple shooting mode. FIGS. 9A', 9B', 9C' and 9D' are bird's-eye views showing the results of analyzing the orientation of the detected faces in the display of FIGS. 9A, 9B, 9C and 9D respectively. In the couple shooting mode of the digital camera 1, when there exists any of the following combinations: both faces being full-faced; the sides of both faces opposing each other; or one of both faces being full-faced and the other being the side facing the full face in combinations of the faces which are the same in size, the distance between the faces is calculated in the next step. A determination whether the orientation of the face corresponds to which combination stated above is made based on whether the orientation of each face is 90 degrees or less from the front to the direction of the other party. An angle of 90 degrees or less from the front to the direction of the other party is shown by slanting lines in FIGS. 9A', 9B', 9C' and 9D'.

In the case of FIG. 9A, as illustrated in FIG. 9A', both are full-faced, so that it is determined that the orientation of both faces is within the area of the slanting lines, and the process proceeds to the next step. In the case of FIG. 9B, as illustrated in FIG. 9B', one is full-faced and the other faces the other party, so that it is determined that the orientation of both faces is within the area of the slanting lines, and the process proceeds to the next step. In the case of FIG. 9C, as illustrated in FIG. 9C', both face each other, so that it is determined that the orientation of both faces is within the area of the slanting lines, and the process proceeds to the next step. In the case of FIG. 9D, as illustrated in FIG. 9D', the right figure is full-faced and the other does not face the other party, so that it is determined that the orientation of the left figure is outside the area of the slanting lines, and the process does not proceed to the next step.

Although the orientation of the face is taken to be 90 degrees or less from the front to the direction of the other party, the orientation of the face is not limited to this degree. Even if one does not face the other party, but if both face the same direction, shooting may be performed.

A determination is made as to the orientation of the face as stated above. If there does not exist a combination in which the orientation of each face is 90 degrees or less as illustrated in FIG. 9D, the process proceeds to step S83 to detect faces again.

If there exists a combination in which the orientation of each face is 90 degrees or less as illustrated in FIGS. 9A, 9B and 9C, a determination is made as to whether the distance between the faces in the combination is 10 pixels or less (step S86).

The CPU 11 inputs the combination in which the ratio between the sizes of the faces is 100%±20% or less and the orientation of each face is 90 degrees or less into the face-distance calculating circuit 23. The face-distance calculating circuit 23 calculates the distance between the faces in the input combination. If the calculated distance between the faces is more than 10 pixels, the process returns to step S83 to detect faces again. If the calculated distance between the faces is 10 pixels or less, the face-distance calculating circuit 23 outputs the exposure starting signal.

When the face-distance calculating circuit 23 outputs the exposure starting signal, the CPU 11 shoots based on the starting signal (step S87) and stores the shooting data in the recording media 31 (step S88).

When the CPU 11 finishes storing the shooting data, the face-distance calculating circuit 23 again calculates the distance between the faces in the combination of the faces which are same in size to determine whether the distance is 10 pixels or less (step S89). If it is 10 pixels or less, the face-distance calculating circuit 23 again outputs the exposure starting signal to shoot (step S87). If the calculated distance between the faces is more than 10 pixels, shooting is finished.

As described above, calculating the distance between the faces in the combination in which the orientation of each face is a predetermined value or less enables shooting at the more optimal photo opportunity. In addition, continuing shooting while faces are close to each other allows a sure shooting.

What is claimed is:

1. An image taking apparatus comprising:
    an image pickup device which picks up an object image and outputs the picked-up image data;
    a face detection device which detects human faces in the image data;
    a face-distance calculating device which calculates a distance between the faces among a plurality of faces detected by the face detection device; and
    a controlling device which controls the image pickup device to start shooting, after a shooting instruction is issued, in the case where the distance between the faces calculated by the face-distance calculating device is not greater than a first predetermined threshold value.

2. The image taking apparatus according to claim 1, further comprising a face-size comparing device which compares sizes of a plurality of the faces detected by the face detection device, wherein
    the face-distance calculating device calculates the distance between the faces among a plurality of faces for which the face-size comparing device determines that the difference between the sizes of the faces is not greater than a second predetermined threshold value.

3. The image taking apparatus according to claim 1, further comprising a face-orientation comparing device which compares orientations of a plurality of the faces detected by the face detection device, wherein
    the face-distance calculating device calculates the distance between the faces among a plurality of faces for which the face-orientation comparing device determines that orientations of both faces correspond to any of the following combinations: both faces being full-faced; the sides of both faces opposing each other; or one of both faces being full-faced and the other being the side facing the full face.

4. The image taking apparatus according to claim 2, further comprising a face-orientation comparing device which compares orientations of a plurality of the faces detected by the face detection device, wherein
    the face-distance calculating device calculates the distance between the faces among a plurality of faces for which the face-orientation comparing device determines that orientations of both faces correspond to any of the following combinations: both faces being full-faced; the sides of both faces opposing each other; or one of both faces being full-faced and the other being the side facing the full face.

5. An image taking apparatus comprising:
    an image pickup device which picks up an object image and outputs the picked-up image data;
    a face detection device which detects human faces in the image data;
    a face-distance calculating device which calculates a distance between the faces among a plurality of faces detected by the face detection device; and
    a controlling device which controls the image pickup device to start shooting, after a shooting instruction is issued, in the case where the distance between the faces calculated by the face-distance calculating device becomes local minimum with respect to change in time.

6. The image taking apparatus according to claim 5, further comprising a face-size comparing device which compares sizes of a plurality of the faces detected by the face detection device, wherein,
    the face-distance calculating device calculates the distance between the faces among a plurality of faces for which the face-size comparing device determines that the difference between the sizes of the faces is not greater than a second predetermined threshold value.

7. The image taking apparatus according to claim 5, further comprising a face-orientation comparing device which compares orientations of a plurality of the faces detected by the face detection device, wherein
    the face-distance calculating device calculates the distance between the faces among a plurality of faces for which the face-orientation comparing device determines that orientations of both faces correspond to any of the following combinations: both faces being full-faced; the sides of both faces opposing each other; or one of both faces being full-faced and the other being the side facing the full face.

8. The image taking apparatus according to claim 6, further comprising a face-orientation comparing device which compares orientations of a plurality of the faces detected by the face detection device, wherein the face-distance calculating device calculates the distance between the faces among a plurality of faces for which the face-orientation comparing device determines that orientations of both faces correspond to any of the following combinations: both faces being full-faced; the sides of both faces opposing each other; or one of both faces being full-faced and the other being the side facing the full face.

9. An image taking method comprising the steps of:

picking up an object image and outputting the picked-up image data;

detecting human faces in the image data;

calculating a distance between the faces among a plurality of faces detected by the face detection step; and controlling the image pickup step to start shooting, after a shooting instruction is issued, in the case where the distance between the faces calculated by the face-distance calculating step is not greater than a first predetermined threshold value.

10. An image taking method comprising the steps of:

picking up an object image and outputting the picked-up image data;

detecting human faces in the image data;

calculating a distance between the faces among a plurality of faces detected by the face detection step; and controlling the image pickup step to start shooting, after a shooting instruction is issued, in the case where the distance between the faces calculated by the face-distance calculating step becomes local minimum with respect to change in time.

* * * * *